United States Patent
Ito

(10) Patent No.: US 10,787,585 B2
(45) Date of Patent: Sep. 29, 2020

(54) AQUEOUS INK FOR INK JET RECORDING

(71) Applicant: Seiko Epson Corporation, Tokyo (JP)

(72) Inventor: Hiroshi Ito, Matsumoto (JP)

(73) Assignee: Seiko Epson Corporation (JP)

( * ) Notice: Subject to any disclaimer, the term of this patent is extended or adjusted under 35 U.S.C. 154(b) by 99 days.

(21) Appl. No.: 16/055,447

(22) Filed: Aug. 6, 2018

(65) Prior Publication Data

US 2019/0040272 A1    Feb. 7, 2019

(30) Foreign Application Priority Data

Aug. 7, 2017  (JP) ................. 2017-152279

(51) Int. Cl.
| | |
|---|---|
| *C09D 11/38* | (2014.01) |
| *C09D 11/324* | (2014.01) |
| *C09D 11/322* | (2014.01) |
| *C08L 83/12* | (2006.01) |
| *C08L 83/04* | (2006.01) |
| *C08G 77/46* | (2006.01) |

(52) U.S. Cl.
CPC .............. *C09D 11/38* (2013.01); *C08L 83/12* (2013.01); *C09D 11/322* (2013.01); *C09D 11/324* (2013.01); *C08G 77/46* (2013.01); *C08L 83/04* (2013.01)

(58) Field of Classification Search
CPC ..................................................... C09D 11/30
See application file for complete search history.

(56) References Cited

U.S. PATENT DOCUMENTS

| | | | |
|---|---|---|---|
| 8,133,314 B2 * | 3/2012 | Ishihara | C09D 11/0235 106/31.86 |
| 9,708,500 B2 * | 7/2017 | Ito | C09D 11/033 |
| 9,878,558 B2 | 1/2018 | Eguchi et al. | |
| 10,538,681 B2 * | 1/2020 | Ito | C09D 11/322 |
| 2004/0091642 A1 | 5/2004 | Murakami et al. | |
| 2004/0157958 A1 | 8/2004 | Vincent et al. | |
| 2008/0097015 A1 | 4/2008 | Doi et al. | |
| 2011/0152442 A1 | 6/2011 | Doi et al. | |
| 2013/0113860 A1 * | 5/2013 | Gotou | C08K 5/3437 347/20 |
| 2015/0103116 A1 * | 4/2015 | Gotou | C09D 11/322 347/21 |
| 2018/0030298 A1 * | 2/2018 | Yamazaki | B41J 2/01 |
| 2018/0273789 A1 * | 9/2018 | Matsuzaki | B41J 11/0015 |
| 2019/0040272 A1 | 2/2019 | Ito | |

FOREIGN PATENT DOCUMENTS

| | | |
|---|---|---|
| JP | 2003-128976 A | 5/2003 |
| JP | 2004-204029 A | 7/2004 |
| JP | 2006-520405 A | 9/2006 |
| JP | 2006-282989 A | 10/2006 |
| JP | 2008-163059 A | 7/2008 |
| JP | 2017-141388 A | 8/2017 |
| WO | WO-2004-072134 A1 | 8/2004 |
| WO | WO-2006-038726 A1 | 4/2006 |

* cited by examiner

*Primary Examiner* — Helene Klemanski
(74) *Attorney, Agent, or Firm* — Harness, Dickey & Pierce, P.L.C.

(57) ABSTRACT

An aqueous ink for ink jet recording includes a coloring material, a water-dispersible polysiloxane-based defoaming agent, a water-soluble silicone-based surfactant, a glycol-based solvent, and resin particles including a non-ionic reactive surfactant in a constituent unit.

4 Claims, No Drawings

AQUEOUS INK FOR INK JET RECORDING

BACKGROUND

1. Technical Field

The present invention relates to an aqueous ink for ink jet recording.

2. Related Art

In the ink jet recording method, small droplets of ink are ejected from fine nozzles and attached to a recording medium to perform recording. This method has the characteristic of being able to record high resolution and high-quality images at a high speed with a relatively inexpensive apparatus.

In the ink jet recording method, there are an extremely large number of factors to be studied, including the properties of the ink used, the stability in recording, and the quality of images to be obtained, and studies are being carried out not only on the ink jet recording apparatuses but also on the inks to be used.

For example, JP-T-2006-520405 discloses an ink jet ink including latex particles to which a reactive surfactant is covalently bonded and which include a cross-linking agent, with the object of forming a good image on a recording medium by stably ejecting ink droplets.

In addition, JP-A-2003-128976 discloses a water-based ink including a coloring material/resin composite particles obtained by dispersing a molecular color developer with a reactive dispersing agent and subsequently polymerizing a resin, with the object of improving the coloring property, glossiness, and fixability of the image to be formed and improving the ejection stability of the ink.

Furthermore, JP-A-2006-282989 discloses an aqueous dispersion for ink jet recording including polymer particles, which are emulsion-polymerized in the presence of a reactive surfactant, and a water-insoluble organic compound where a log P value (logarithm of the distribution coefficient of 1-octanol of the organic compound/water) is −1 to 11, with the object of improving printing density and marker resistance.

In the techniques described in JP-T-2006-520405, JP-A-2003-128976, and JP-A-2006-282989 described above, a reactive surfactant or a reactive dispersing agent is used to prepare latex particles, coloring material/resin composite particles, or polymer particles by emulsion polymerization. Such particles have a function of improving the fixability of recorded images.

Here, in the emulsion polymerization method, since an emulsifier is essential at the time of polymerization and the emulsifier remains in the system after polymerization, the obtained aqueous dispersion has a property of foaming easily. Then, in a case where such an aqueous dispersion is used for ink for ink jet recording which is intermittently ejected (discharged) as liquid droplets, for example, cleaning operations or the like easily cause the ink to foam and it is also difficult to eliminate the generated bubbles. Therefore, minute bubbles are easily taken into the flow path of the recording head or the like, and the ejection property of the ink may deteriorate.

Reducing the amount of emulsifier during the polymerization of the resin particles may be considered as a method for making bubbles less likely to occur. However, when the added amount of the emulsifier is reduced during the emulsion polymerization as described above, the dispersibility of the resin particles is insufficient and it is difficult to obtain storage stability when used in an ink.

In addition, adopting a reactive surfactant able to function as an emulsifier at the time of reaction and incorporating the emulsifier into the particles after polymerization may be considered as a method for making bubbles less likely to occur without reducing the emulsifier. However, in order to reduce the remaining emulsifier, it is necessary to reduce the amount of unreacted (free) reactive surfactant and it is still difficult to obtain a reaction yield (conversion) of 100% in the polymerization of the reactive surfactant.

Under such circumstances, the use of a defoaming agent may be considered as a method for making bubbles less likely to occur and making the generated bubbles easily breakable without reducing the unreacted reactive surfactant and added emulsifier. There are many kinds of defoaming agents and the materials and defoaming mechanisms thereof are diverse. In many cases, defoaming agents have high hydrophobicity and combination with such a defoaming agent may destroy the dispersed state of the resin particles dispersed in water and lead to the generation of aggregates. When such a defoaming agent is used, the aggregates become larger than a certain size and clog the recording head or ink flow path, which may cause ejection defects. In addition, depending on the kind of defoaming agent, the ink may be repelled from the printed surface and problems often occur if the defoaming agent is selected without considering the combination with other materials in the ink.

JP-A-2006-282989 describes the use of a defoaming agent, but does not suggest specific materials or combinations thereof and, in ink for ink jet recording in particular, there is a concern that the use of a water-insoluble organic compound as described in JP-A-2006-282989 as a defoaming agent may aggregate the resin particles and coloring material through combination with other materials in the ink, similarly to highly hydrophobic defoaming agents.

SUMMARY

An advantage of some aspects of the invention is to provide an aqueous ink for ink jet recording which has good storage stability, a good defoaming property, and good ejection stability.

The invention can be realized in the following aspects or application examples.

According to an aspect of the invention, there is provided an aqueous ink for ink jet recording including a coloring material, a water-dispersible polysiloxane-based defoaming agent, a water-soluble silicone-based surfactant, a glycol-based solvent, and resin particles including a non-ionic reactive surfactant in a constituent unit.

Since the aqueous ink for ink jet recording includes a water-dispersible polysiloxane-based defoaming agent, a water-soluble silicone-based surfactant, and a glycol-based solvent, the defoaming agent is sufficiently solubilized, which suppresses bubbles, and, due to this, the ejection stability is good. In addition, since the resin particles include a non-ionic reactive surfactant in a constituent unit, the aqueous ink for ink jet recording has a good affinity with the glycol-based solvent and, due to this, has good dispersion stability. Due to this, the resin particles do not aggregate easily and the storage stability is good.

In the aqueous ink for ink jet recording according to the invention, a content of the water-dispersible polysiloxane-based defoaming agent may be 0.01% by mass or more and 1% by mass or less.

Such an aqueous ink for ink jet recording has a better defoaming effect due to the defoaming agent, is able to sufficiently solubilize the defoaming agent, and has better storage stability, a better defoaming property, and better discharge stability.

In the aqueous ink for ink jet recording according to the invention, a content of the water-soluble silicone-based surfactant may be 0.1% by mass or more and 5% by mass or less.

Such an aqueous ink for ink jet recording is able to more sufficiently solubilize the defoaming agent and has better storage stability, a better defoaming property, and better discharge stability.

In the aqueous ink for ink jet recording according to the invention, a water-octanol distribution coefficient of the glycol-based solvent may be 0.0 or more and 2.0 or less.

Such an aqueous ink for ink jet recording is able to more sufficiently solubilize the defoaming agent and has better storage stability, a better defoaming property, and better discharge stability.

DESCRIPTION OF EXEMPLARY EMBODIMENTS

A description will be given below of several embodiments of the invention. The embodiments illustrated below illustrate one example of the invention. The invention is not limited to the following embodiments at all and includes various modifications implemented in a range not departing from the gist of the invention. Here, not all of the configurations described below are necessarily essential components of the invention.

1. AQUEOUS INK FOR INK JET RECORDING

The aqueous ink for ink jet recording according to the present embodiment includes a coloring material, a water-dispersible polysiloxane-based defoaming agent, a water-soluble silicone-based surfactant, a glycol-based solvent, and resin particles including a non-ionic reactive surfactant in a constituent unit.

1.1. Coloring Material

The aqueous ink for ink jet recording according to the present embodiment includes a coloring material. As the coloring material, it is possible to use either a pigment or a dye, and it is possible to use an inorganic pigment including carbon black, an organic pigment, an oil soluble dye, an acidic dye, a direct dye, a reactive dye, a basic dye, a dispersion dye, or the like. In the aqueous ink for ink jet recording of the present embodiment, the coloring material may be dispersed with a dispersing resin.

As the inorganic pigment, it is possible to use carbon black (C.I. Pigment Black 7) such as furnace black, lamp black, acetylene black, and channel black, iron oxide, titanium oxide, zinc oxide, silica, and the like.

Examples of carbon black include No. 2300, 900, MCF 88, No. 20B, No. 33, No. 40, No. 45, No. 52, MA 7, MA 8, MA 100, No. 2200 B, and the like, manufactured by Mitsubishi Chemical Corp. Examples include Color Black FW 1, FW 2, FW 2V, FW 18, FW 200, 5150, 5160, 5170, Printex 35, U, V, 140U, Special Black 6, 5, 4A, 4, 250, and the like, manufactured by Degussa. Examples include Conductex SC, Raven 1255, 5750, 5250, 5000, 3500, 1255, 700, and the like, manufactured by Columbia Carbon Co., Ltd. Examples include Regal 400R, 330R, 660R, Mogul L, Monarch 700, 800, 880, 900, 1000, 1100, 1300, 1400, Elftex 12, and the like, manufactured by Cabot Corp.

Examples of organic pigments include quinacridone-based pigments, quinacridone quinone-based pigments, dioxazine-based pigments, phthalocyanine-based pigments, anthrapyrimidine-based pigments, anthanthrone-based pigments, indanthrone-based pigments, flavanthrone-based pigments, perylene-based pigments, diketopyrrolo pyrrole-based pigments, perinone-based pigments, quinophthalone-based pigments, anthraquinone-based pigments, thioindigo-based pigments, benzimidazolone-based pigments, isoindolinone-based pigments, azomethine-based pigments, azo-based pigments, and the like.

Specific examples of the organic pigment used in the aqueous ink for ink jet recording include the following.

Examples of cyan pigments include C.I. Pigment Blue 1, 2, 3, 15:3, 15:4, 15:34, 16, 22, 60 and the like; C.I. Vat Blue 4, 60, and the like, and preferably mixtures of one kind or two kinds or more selected from the group formed of C.I. Pigment Blue 15:3, 15:4, and 60.

Examples of magenta pigments include C.I. Pigment Red 5, 7, 12, 48 (Ca), 48 (Mn), 57 (Ca), 57:1, 112, 122, 123, 168, 184, and 202; C.I. Pigment Violet 19 and the like, and preferably mixtures of one kind or two kinds or more selected from a group formed of C.I. Pigment Red 122, 202, and 209, and C.I. Pigment Violet 19.

Examples of yellow pigments include C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, 185, and the like, and preferably mixtures of one kind or two kinds or more selected from a group formed of C.I. Pigment Yellow 74, 109, 110, 128, and 138.

Examples of orange pigments include C.I. Pigment Orange 36 or 43 or a mixture thereof. Examples of pigments used for the aqueous ink for green ink jet recording include C.I. Pigment Green 7 or 36 or a mixture thereof.

The pigments exemplified above are examples of suitable pigments, and the invention is not limited thereto. These pigments may be used as one kind or in a mixture of two or more kinds or may be used in combination with a dye.

In addition, the pigment may be used by dispersing the pigment using a dispersing agent selected from a water-soluble resin, a water-dispersible resin, and a surfactant, or may be used as a self-dispersing pigment by oxidizing or sulfonating the pigment surface with ozone, hypochlorous acid, fuming sulfuric acid, or the like.

In the aqueous ink for ink jet recording of the present embodiment, in a case where the pigment is dispersed with the dispersing resin, the ratio of the pigment to the dispersing resin is preferably 10:1 to 1:10, and more preferably 4:1 to 1:3. In addition, for the volume average particle size of the pigment at the time of dispersion, in a case of being measured by dynamic light scattering method, the maximum particle size is less than 500 nm and the average particle size is 300 nm or less, and the average particle size is more preferably 200 nm or less.

Examples of dyes able to be used in the aqueous ink for ink jet recording of the present embodiment include, as water dissolving dyes, acid dyes, direct dyes, reactive dyes, and basic dyes, and, as aqueous dispersion dyes, dispersion dyes, oil soluble dyes, and the like.

Examples of acid dyes include C.I. Acid Yellow 17, 23, 42, 44, 79, 142, C.I. Acid Red 52, 80, 82, 249, 254, 289, C.I. Acid Blue 9, 45, 249, C.I. Acid Black 1, 2, 24, 94, and the like.

Examples of direct dyes include C.I. Direct Yellow 1, 12, 24, 33, 50, 55, 58, 86, 132, 142, 144, 173, C.I. Direct Red 1, 4, 9, 80, 81, 225, 227, C.I. Direct Blue 1, 2, 15, 71, 86, 87, 98, 165, 199, 202, C.I. Direct black 19, 38, 51, 71, 154, 168, 195, C.I. Direct Blue 2, 3, 8, 10, 12, 31, 35, 63, 116, 130, 149, 199, 230, 231, and the like.

Examples of reactive dyes include C.I. Reactive Yellow 2, 7, 15, 22, 37, 42, 57, 69, 76, 81, 95, 102, 125, 135, C.I. Reactive Red 2, 14, 24, 32, 55, 79, 106, 111, 124, C.I. Reactive Blue 2, 13, 21, 38, 41, 50, 69, 72, 109, 120, 143, C.I. Reactive Black 3, 4, 5, 8, 13, 14, 31, 34, 35, 39, and the like.

Examples of basic dyes include C.I. Basic Yellow 1, 2, 13, 19, 21, 25, 32, 36, 40, 51, C.I. Basic Red 1, 5, 12, 19, 22, 29, 37, 39, 92, C.I. Basic Blue 1, 3, 9, 11, 16, 17, 24, 28, 41, 45, 54, 65, 66, C.I. Basic Black 2, and, 8, and the like.

In addition, as the dispersion dye and the oil soluble dye, it is possible to use any coloring material as long as the coloring material is dispersed but not dissolved in the ink vehicle, and examples thereof include azo-based dyes, metal complex salt azo-based dyes, anthraquinone-based dyes, phthalocyanine-based dyes, triallyl methane-based dyes, and the like.

Examples of the dispersion dye include C.I. Disperse Red 60, 82, 86, 86:1, 167:1, 279, C.I. Disperse Yellow 64, 71, 86, 114, 153, 233, 245, C.I. Disperse Blue 27, 60, 73, 77, 77:1, 87, 257, 367, C.I. Disperse Violet 26, 33, 36, 57, C.I. Disperse Orange 30, 41, 61, and the like.

Examples of oil-soluble dyes include C.I. Solvent Yellow 16, 21, 25, 29, 33, 51, 56, 82, 88, 89, 150, 163, C.I. Solvent Red 7, 8, 18, 24, 27, 49, 109, 122, 125, 127, 130, 132, 135, 218, 225, 230, C.I. Solvent Blue 14, 25, 35, 38, 48, 67, 68, 70, 132, C.I. Solvent Black 3, 5, 7, 27, 28, 29, 34, and the like.

The dyes exemplified above are examples of suitable coloring materials, and the invention is not limited thereto. These dyes may be used as one kind or as a mixture of two or more kinds or may be used in combination with a pigment.

It is possible to appropriately adjust the content of the coloring material depending on the application, and the content is preferably 0.10% by mass or more and 20.0% by mass or less, more preferably 0.20% by mass or more and 15.0% by mass or less, and even more preferably 1.0% by mass or more and 10.0% by mass or less.

1.2. Water-Dispersible Polysiloxane-Based Defoaming Agent

The aqueous ink for ink jet recording of the present embodiment includes a water-dispersible polysiloxane-based defoaming agent. The water-dispersible polysiloxane-based defoaming agent is a defoaming agent in an emulsified form or an emulsion form. Polysiloxane and silicone have a common structure in terms of including siloxane units, but silicone has a larger molecular weight (the number of repeating units).

Specific examples of such water-dispersible polysiloxane-based defoaming agents include KM-73A, KM-73E, KM-71, KM-75, KM-85, KM-89, KM-98, KM-7752, KS-531, KS-540, KS-530, KS-537, and KS-538 (all trade names, manufactured by Shin-Etsu Chemical Co., Ltd.), BYK-020, BYK-021, BYK-022, BYK-023, BYK-024, BYK-044, and BYK-094 (all trade names, manufactured by BYK Chemie Japan), and TSA 6406, TSA 780, TSA 739, and TSA 775 (all trade names, manufactured by Momentive Performance Materials Japan, LLC), and the like.

It is possible to use the water-dispersible polysiloxane-based defoaming agent alone or in a combination of a plurality of kinds. It is possible to appropriately adjust the total content of the water-dispersible polysiloxane-based defoaming agent depending on the application, and 0.01% by mass or more and 5.0% by mass or less is preferable, 0.05% by mass or more and 3.0% by mass or less is more preferable, and 0.1% by mass or more and 1.0% by mass or less is even more preferable. When the blending amount of the defoaming agent is in this range, sufficient solubilization occurs in the aqueous ink for ink jet recording, and it is possible to sufficiently obtain the defoaming effect.

As one example of a function of the water-dispersible polysiloxane-based defoaming agent in the present embodiment, bubbles are less easily generated in a case where the aqueous ink for ink jet recording is shaken, for example, in the ink container or the recording head. In addition, as one example of a function of the water-dispersible polysiloxane-based defoaming agent, bubbles are easily eliminated in a case where bubbles are generated in the aqueous ink for ink jet recording. In the present specification, these functions and actions may be referred to as a defoaming effect. In a case where the aqueous ink for ink jet recording is used in an ink jet recording apparatus, due to the defoaming effect of the water-dispersible polysiloxane-based defoaming agent, for example, the flow path of ink in a recording head or the like is not easily clogged, and it is possible to suppress loss of pressure applied to the aqueous ink for ink jet recording and to increase the ejection stability of the aqueous ink for ink jet recording from the recording head.

1.3. Water-Soluble Silicone-Based Surfactant

The aqueous ink for ink jet recording of the present embodiment includes a water-soluble silicone-based surfactant. The water-soluble silicone-based surfactant is, for example, a polyether-modified silicone, and has a structure in which a polyether chain such as polyoxyethylene is introduced into a silicone skeleton. The hydrophilic group of the water-soluble silicone-based surfactant is, for example, a polyether chain, and the hydrophobic group is the moiety of the polysiloxane skeleton.

One function of the water-soluble silicone-based surfactant is to solubilize the water-dispersible polysiloxane-based defoaming agent described above. That is, one example is solubilizing the water-dispersible polysiloxane-based defoaming agent due to the affinity between the siloxane unit of the water-soluble silicone-based surfactant and the siloxane unit of the water-dispersible polysiloxane-based defoaming agent and the water-soluble property of the water-soluble silicone-based surfactant. Solubilizing the water-dispersible polysiloxane-based defoaming agent makes it possible to increase the added amount of the water-dispersible polysiloxane-based defoaming agent and increase the defoaming effect of the ink. In addition, one of the functions of the water-soluble silicone-based surfactant is to lower the surface tension of the ink at the time of dissolving in water, and it is possible to adjust the wettability of the ink with respect to the printing base material and the ejection flow path.

Specific example of the water-soluble silicone-based surfactants include Silface SAG002, SAG005, SAG503A, and SAG008 (the above are trade names, manufactured by Nissin Chemical Industry Co., Ltd.), BYK-306, BYK-307, BYK-333, BYK-341, BYK-345, BYK-346, BYK-347, BYK-348, and BYK-349 (the above are trade names, manufactured by BYK Chemie Japan), KF-351A, KF-352A, KF-353, KF-354L, KF-355A, KF-615A, KF-945, KF-640, KF-642, KF-643, KF-6020, X-22-4515, KF-6011, and KF-6012 (the above are trade names, manufactured by Shin-Etsu Chemical Co., Ltd.), YSA 6403 (trade names, manufactured by Momentive Performance Materials Japan, LLC) and the like.

It is possible to use the water-soluble silicone-based surfactant alone or in a combination of a plurality of kinds.

It is possible to appropriately adjust the total content of the water-soluble silicone-based surfactant depending on the application, and 0.1% by mass or more and 5.0% by mass or less is preferable, 0.2 mass% or more and 3.0% by mass or less is more preferable, and 0.3% by mass or more and 1.0% by mass or less is even more preferable. When the blending amount of the water-soluble silicone-based surfactant is in this range, it is possible to sufficiently obtain the wettability of the aqueous ink for ink jet recording.

1.4. Glycol-Based Solvent

The aqueous ink for ink jet recording of the present embodiment includes a glycol-based solvent. The log P value of the glycol-based solvent is not limited, but from the viewpoints of solubility in water and affinity with a solvent, the log P value is −0.5 or more and 5.0 or less, preferably −0.2 or more and 3 or less, and more preferably 0.0 or more and 2.0 or less.

Here, the water-octanol distribution coefficient, that is, the log P value, is a value defined by OECD Test Guideline 107. The higher the log P value, the higher the hydrophobicity, and the lower the log P value, the higher the hydrophilicity.

One of the functions of glycol-based solvents is to impart affinity between a highly hydrophobic component and water. In addition, including a glycol-based solvent in the aqueous ink for ink jet recording of the present embodiment makes it possible to increase the affinity between the water-soluble silicone-based surfactant and water, and, due to this, it is possible to more easily solubilize the water-dispersible polysiloxane-based defoaming agent. In addition, including a glycol-based solvent makes it possible to increase the blending amount of resin particles described below and to improve the storage stability of the ink.

Specific examples of glycol-based solvents include 1,2-pentanediol (log P: 0.01), 1,2-hexanediol (log P: 0.70), 1,2-heptanediol (log P: 1.0), 2-methyl-3-phenoxy-1,2-propanediol (log P: 1.10), 3-(3-methylphenoxy)-1,2-propanediol (log P: 1.21), 3-hexyloxy-1,2-propanediol (log P: 1.36), 2-butyl-2-ethyl-1,3-propanediol (log P: 1.78), 1,3-pentanediol, 2-ethyl-1,3-propanediol, 1,6-hexanediol, 1,2-butanediol, 1,4-butanediol, 1,5-pentanediol, and glycols such as ethylene glycol, diethylene glycol, triethylene glycol, butylene glycol, polyethylene glycol, propylene glycol, dipropylene glycol, polypropylene glycol, and polyoxyethylene polyoxypropylene glycol. For some of the above compounds, the log P value was added in parentheses.

The glycol-based solvents may be used alone or in a combination of two or more kinds. The total blending amount of the glycol-based solvent is 0.5% by mass or more and 30% by mass or less with respect to the total amount of the aqueous ink for ink jet recording, preferably 1% by mass or more and 20% by mass or less, more preferably 2% by mass or more and 15% by mass or less, and even more preferably 3% by mass or more and 10% by mass or less. When the blending amount of the glycol-based solvent is within this range, it is possible to sufficiently obtain the solubility for the water-soluble silicone-based surfactant and the resin particles described below, and to increase the solubility of the water-dispersible polysiloxane-based defoaming agent. Due to this, it is possible to more sufficiently solubilize the defoaming agent and to suppress aggregation of the resin particles.

1.5. Resin Particles Containing Non-Ionic Reactive Surfactant in Constituent Unit The aqueous ink for ink jet recording of the present embodiment contains resin particles including a non-ionic reactive surfactant in a constituent unit.

One of functions of resin particles including a non-ionic reactive surfactant (also referred to as a non-ionic reactive emulsifier) in a constituent unit is to stick (fix) the coloring material to the recording medium. Resin particles including a non-ionic reactive surfactant in a constituent unit are in a particulate form in an aqueous ink for ink jet recording, and due to this, it is possible to suppress the viscosity of the aqueous ink for ink jet recording to be low in comparison with a case of blending a fixing resin as a solution.

It is possible to synthesize resin particles including a non-ionic reactive surfactant in a constituent unit as a dispersion by emulsion polymerization or suspension polymerization using addition polymerization monomers. The manner of the emulsion polymerization and suspension polymerization is not particularly limited, and it is possible to adopt a method in which all the monomers used for polymerization are mixed to prepare a monomer composition in an emulsified state and the monomer composition is dropped into an initiator solution, a method in which monomers used in the polymerization are divided into a plurality of kinds and/or amounts, a plurality of monomer compositions are prepared in an emulsified state, and the monomer compositions are dropped into the initiator solution, or the like. Due to the polymerization reaction, the monomers are covalently bonded to each other to form a polymer (high molecular weight polymer), which takes a particulate form.

As the monomer used for polymerization, it is possible to use acrylic acid esters such as methyl acrylate and ethyl acrylate, methacrylic acid esters such as methyl methacrylate, and ethyl methacrylate, and 2-ethylhexyl methacrylate, compounds having a carbon-carbon double bond such as vinyl acetate, ethylene, propylene, isobutylene, butadiene, styrene, methylstyrene, styrene sulfonic acid and salts thereof, vinyl chloride, maleic anhydride, and divinylbenzene.

In addition, the non-ionic reactive surfactant unit introduced as a result into the resin particles of the present embodiment is introduced using a non-ionic reactive surfactant as a monomer. That is, the non-ionic reactive surfactant is a compound including a carbon-carbon double bond and is incorporated into the constituent unit of the resin particle using this double bond.

The hydrophilic moiety of the non-ionic reactive surfactant is not particularly limited, but is preferably a polyoxyethylene chain and a hydroxyl group or the like at the terminal thereof. In a case where the non-ionic reactive surfactant has a polyoxyethylene chain, since the affinity with the glycol-based solvent described above is increased, it is possible to further increase the dispersion of the resin particles in the aqueous ink for ink jet recording.

Thus, in a case where the resin particles including the non-ionic reactive surfactant in a constituent unit have a polyoxyethylene chain, the dispersion is stabilized by the affinity between the polyoxyethylene chain and the glycol-based solvent described above. Due to this, for example, even in a case where the aqueous ink for ink jet recording is dried in the vicinity of the nozzles of the recording head, hardening does not easily occur, and re-ejection by a cleaning operation or the like is easy. After printing, the glycol-based solvent penetrates into the recording medium or evaporates and volatilizes and separates from the resin particles, which is also able to contribute to increasing the water resistance of the recorded matter.

Specific examples of the non-ionic reactive surfactant include Aqualon RN (trade name, manufactured by DKS Co., Ltd.), Latemul PD-420, Latemul PD-430, Latemul PD-450 (the above are trade names, manufactured by Kao Corp.), Adeka Reasoap ER-10, Adeka Reasoap ER-20, Adeka Reasoap ER-30, Adeka Reasoap ER-40 (the above are trade names, manufactured by ADEKA), Anthox LMA-10, Anthox LMA-20, Anthox LMA-27 (the above are trade names, manufactured by Nippon Nyukazai Co., Ltd.), and the like. In the polymerization of the resin particles, one or a plurality of non-ionic reactive surfactants may be used.

The polymerization initiator for emulsion polymerization or suspension polymerization is not particularly limited, but water-soluble polymerization initiators such as potassium persulfate, ammonium persulfate, azobisisobutyronitrile, benzoyl peroxide, dibutyl peroxide, and the like are preferable.

In this manner, it is possible to obtain resin particles including a non-ionic reactive surfactant in a constituent unit by emulsion polymerization or suspension polymerization, and the polymerization may be carried out in multiple stages. For example, emulsion polymerization or suspension polymerization may be performed beforehand in a system which does not include the non-ionic reactive surfactant described above, and then emulsion polymerization or suspension polymerization may be performed sequentially in a system including a non-ionic reactive surfactant. In this manner, it is possible to obtain resin particles in which the proportion of the non-ionic reactive surfactant in the core (core) portion is small, and the proportion of the non-ionic reactive surfactant in the shell (shell) portion is large. Due to this, it is possible to obtain resin particles having a sufficient function, for example, using a smaller amount of a non-ionic reactive surfactant.

As described above, in a case where the polymerization of the resin particles is performed sequentially, when emulsion polymerization or suspension polymerization is performed in a system not including a non-ionic reactive surfactant, it is possible to use an appropriate surfactant in order to carry out emulsification or suspension. The surfactant used in this case is not particularly limited and it is possible to use a non-reactive surfactant.

Examples of the non-reactive surfactant include Hitenol NF-08, Hitenol NF-17, Hitenol 330T, Hitenol LA-10, Plysurf A 212C, and Plysurf A 208B (the above are trade names, manufactured by DKS Co., Ltd., Latemul WX, Latemul E-150, Emulgen 1108, Emulgen 1150 S-60, Pelex SS-H, and Pelex SS-L (the above are trade names, manufactured by Kao Corp.), Eleminol CLS-20, Eleminol MON-7, and Sanmorin OT-70 (the above are trade names, manufactured by Sanyo Chemical Industries, Ltd.).

When the non-ionic reactive surfactant described above is used in the emulsion polymerization or the suspension polymerization, it is possible to carry out the emulsification or suspension before and during the polymerization, and furthermore, as the polymerization reaction proceeds, the compound functioning as an emulsifier (reactive surfactant) is reduced. Accordingly, when the polymerization reaction is completed, it is possible to sufficiently reduce the amount of the emulsifier remaining in the system in a free state. The emulsified liquid or suspension formed due to this makes it less likely for bubbles to be generated. The group functioning as an emulsifier is bonded to the resin particles, and even if the amount of the emulsifier (surfactant) remaining in the system is small, the dispersibility of the resin particles is not greatly impaired. Even in a case where a reactive surfactant is used as a monomer, it is also possible to carry out polymerization by allowing a non-reactive surfactant (non-reactive surfactant) to be present in order to compensate for the emulsifying power, and in that case, it is possible to reduce the usage amount of the reactive surfactant. Furthermore, in emulsion polymerization or suspension polymerization, it is also possible to carry out polymerization in the presence of a chain transfer agent, an oligomer, and a macromer. In addition, it is possible to synthesize the resin particles by emulsion polymerization using a plurality of kinds of monomers, but the resin particles may be synthesized by sequentially conducting polymerization using various kinds of monomers alone or a mixture thereof.

Generally, in emulsion polymerization or suspension polymerization, an emulsifier (surfactant) having no reactivity is added alone in order to emulsify or suspend the monomer. In such a case, after completion of the polymerization reaction, the emulsifier remains in the system in a free state. The emulsified liquid or suspension formed due to this often has a property of foaming easily. However, as exemplified above, in a case of sequential synthesis in which polymerization is carried out in a system including a reactive surfactant after polymerization in the presence of a non-reactive surfactant, since it is easy for the non-reactive surfactant to be present in the core of the resin particles, foaming of the formed emulsified liquid or suspension is more suppressed than in general cases.

The total blending amount of the non-ionic reactive surfactant when synthesizing the resin particles is 0.5% by mass or more and 5% by mass or less in a case where the total of the monomers is 100% by mass, preferably 1% by mass or more and 4.5% by mass or less, more preferably 1.5% by mass or more and 4% by mass or less, and even more preferably 2% by mass or more and 3.5% by mass or less. In addition, even in a case where sequential polymerization is performed, the blending amount of non-ionic reactive surfactant when synthesizing the resin particles is preferably set in the above range in the total of the monomers used in each polymerization reaction.

In addition, in the aqueous ink for ink jet recording, the blending amount (solid content) of the resin particles including the non-ionic reactive surfactant in a constituent unit also includes cases of using a plurality of kinds and 0.5% by mass or more and 20% by mass or less is preferable as the solid content with respect to the total mass of the aqueous ink for ink jet recording as the total amount, and 1% by mass or more and 15% by mass or less is more preferable. When the content of the resin particles is 0.5% by mass or more, the adhesion of the aqueous ink for ink jet recording to the recording medium is further improved. In addition, when the content of the resin particles is 20% by mass or less, the ejection property of the aqueous ink for ink jet recording from the recording head tends to be good.

From the viewpoint of dispersibility and ejection stability, the volume-based average particle size of the resin particles including the non-ionic reactive surfactant in a constituent unit is 100 nm or more and 500 nm or less, preferably 150 nm or more and 400 nm or less, and more preferably 200 nm or more and 300 nm or less. It is possible to appropriately set the particle size, for example, according to various conditions (stirring conditions, temperature, and the like) during emulsion polymerization. It is possible to measure the volume-based average particle size of the resin particles by, for example, a particle size distribution measuring apparatus using the laser diffraction scattering method as the measurement principle. Examples of a particle size distribution measuring apparatus include a particle size distribution meter (for example, "Microtrac UPA" manufactured by Nikkiso Co., Ltd.) with the dynamic light scattering method as a measurement principle.

1.6. Water

The aqueous ink for ink jet recording according to the present embodiment includes water. Examples of the water include water obtained by removing ionic impurities as much as possible such as pure water and ultrapure water such as ion exchanged water, ultra-filtered water, reverse osmosis water, and distilled water. In addition, when water sterilized by ultraviolet irradiation, addition of hydrogen peroxide, or the like is used, it is possible to suppress the generation of bacteria and fungi in the case of long-term storage of the aqueous ink for ink jet recording.

The content of water is 30% by mass or more with respect to the total amount of the aqueous ink for ink jet recording, preferably 40% by mass or more, more preferably 45% by mass or more, and even more preferably 50% by mass or more. "Water" in the aqueous ink for ink jet recording includes water to which a pigment dispersion used as the raw material and a resin particle dispersion are added. The content of water being 30% by mass or more makes it possible to obtain an aqueous ink for ink jet recording relatively low in viscosity. In addition, the upper limit of the content of water is preferably 90% by mass or less with respect to the total amount of the aqueous ink for ink jet recording, more preferably 85% by mass or less, and even more preferably 80% by mass or less. Here, a case of referring to "aqueous ink" in the present specification refers to an ink containing water in an amount of 30% by mass or more with respect to the total mass (100% by mass) of the ink.

1.7. Other Components

The aqueous ink for ink jet recording of the present embodiment may contain components such as a surfactant (emulsifier), an organic solvent, a moisturizer, a pH adjusting agent, and the like other than those described above.

1.7.1. Other Surfactants

As long as the function of the aqueous ink for ink jet recording of the present embodiment is not inhibited due to interaction with the defoaming agent, the water-soluble silicone-based surfactant, the glycol-based solvent, and the resin particles, the aqueous ink for ink jet recording may include a surfactant (emulsifier) other than those described above, for example, for the purpose of adjusting the surface tension or the like. It is possible to appropriately select the surfactant, for example, from non-ionic surfactants, anionic surfactants, cationic surfactants, and amphoteric surfactants. Among these, an acetylene glycol-based surfactant having high surface activity and a low foaming property is more preferable.

The acetylene glycol surfactant is not particularly limited and examples thereof include E series such as Olfine E1004, E1010, and E1020, PD-001, PD-002 W, PD-004, PD-005, EXP. 4200, EXP. 4123, EXP. 4300 (the above are trade names, manufactured by Nissin Chemical Industry Co., Ltd.), Surfynol 440, 465, 485, CT 111, CT 121, TG, GA, Dynol 604, and 607 (the above are trade names, manufactured by Air Products Japan, Inc.), Acetylenol E40, E60, and E100 (the above are trade names, manufactured by Kawaken Fine Chemicals Co., Ltd.), and the like.

1.7.2. Other Solvent

The aqueous ink for ink jet recording of the present embodiment may include a solvent other than the glycol-based solvent described above. Examples of such solvents include glycol monoethers such as ethylene glycol monomethyl ether, ethylene glycol monoethyl ether, diethylene glycol monomethyl ether, diethylene glycol monoethyl ether, and propylene glycol monomethyl ether, lower alcohols such as ethanol, propanol, and butanol, ester-based solvents such as triacetin, 1-butyral (log P: −0.21), glycerin 1-methacrylate, 3-isopentyloxy-1,2 propanediol, α-monocaproin, 1,3-dibutyrin, and 2-ethylhexanoic acid 2,3-dihydroxypropyl, and the like. In addition, a plurality of kinds may be mixed and used as the first solvent.

The blending amount in a case of blending solvents other than the glycol-based solvent is 0.2% by mass or more and 30% by mass or less with respect to the total amount of the aqueous ink for ink jet recording, preferably 0.4% by mass or more and 20% by mass or less, more preferably 0.5% by mass or more and 15% by mass or less, and even more preferably 0.7% by mass or more and 10% by mass or less.

1.7.3. Moisturizer

The aqueous ink for ink jet recording of the present embodiment may contain a moisturizer. The moisturizer is not particularly limited and any moisturizer generally used for an aqueous ink for ink jet recording is able to be used. The boiling point of the moisturizer is preferably 180° C. or higher, more preferably 200° C. or higher, and even more preferably 250° C. or higher. The boiling point being within the above range makes it possible to impart good water retention and wettability to the aqueous ink for ink jet recording.

Specific examples of the moisturizer include polyols having three or more hydroxyl groups such as glycerin, diglycerin, mesoerythritol, trimethylolpropane, pentaerythritol, and dipentaerythritol, lactams such as 2-pyrrolidone, N-methyl-2-pyrrolidone, ε-caprolactam, and hydroxyethyl pyrrolidone, urea derivatives such as urea, thiourea, ethylene urea, and 1,3-dimethyl imidazolidinones, monosaccharides, disaccharides, oligosaccharides, and polysaccharides and derivatives of these saccharides such as glucose, mannose, fructose, ribose, xylose, arabinose, galactose, aldonic acid, glucitol (sorbitol), maltose, cellobiose, lactose, sucrose, trehalose, and maltotriose, betaines such as glycine, trimethylglycine, DL-carnitine, and the like.

The blending amount in a case where a moisturizer is blended in the aqueous ink for ink jet recording of the present embodiment is 0.2% by mass or more and 30% by mass or less with respect to the total amount of the aqueous ink for ink jet recording, preferably 0.4% by mass or more and 20% by mass or less, more preferably 0.5% by mass or more and 15% by mass or less, and even more preferably 0.7% by mass or more and 10% by mass or less.

1.7.4. pH Adjusting Agent

It is possible to add a pH adjusting agent to the aqueous ink for ink jet recording of the present embodiment for the purpose of adjusting the pH thereof. The pH adjusting agent is not particularly limited and examples thereof include inorganic acids such as sulfuric acid, hydrochloric acid, and nitric acid, inorganic bases such as lithium hydroxide, sodium hydroxide, potassium hydroxide, and ammonia, organic bases such as triethanolamine, diethanolamine, monoethanolamine, triisopropanolamine, diisopropanolamine, and trishydroxymethylaminomethane, organic acids such as adipic acid, citric acid, succinic acid, and lactic acid.

1.7.5. Other Components

It is possible to appropriately add various additives to the aqueous ink for ink jet recording according to the present embodiment, such as a preservative, a dissolution aid, a viscosity adjusting agent, an antioxidant, a mildewproofing agent, and a chelating agent for capturing metal ions affecting dispersion for maintaining good storage stability of the ink and ejection stability from the head, for improving the clogging, or for preventing deterioration of the aqueous ink for ink jet recording.

1.8. Functional Effect

Since the aqueous ink for ink jet recording according to the present embodiment includes a polysiloxane-based defoaming agent, a silicone-based surfactant, and a glycol-based solvent, solubilization of the defoaming agent is good, bubbles are suppressed, and the ejection stability is good. In addition, since the resin particles of the aqueous ink for ink jet recording include a non-ionic reactive surfactant in a constituent unit, the affinity with a glycol-based solvent is improved such that the dispersion stability is good, particularly in a case of having a polyoxyethylene chain. Due to this, the resin particles do not easily aggregate and the storage stability is good.

2. INK JET RECORDING APPARATUS

It is possible to suitably use the aqueous ink for ink jet recording of the present embodiment for an ink jet recording apparatus. The ink jet recording apparatus is not particularly limited as long as the ink jet recording apparatus has at least an ink storage container (cartridge, tank, or the like) for storing the aqueous ink for ink jet recording described above and a recording head connected thereto and is able to form an image on a recording medium by ejecting the aqueous ink for ink jet recording described above from the recording head.

As the ink jet recording apparatus of the present embodiment, it is possible to use either a serial type or a line type apparatus. In these kinds of ink jet recording apparatus, a recording head is mounted, and it is possible to form a predetermined image by ejecting droplets of aqueous ink for ink jet recording from the nozzle holes of the recording head at a predetermined timing (intermittently) and with a predetermined volume (mass) while changing the relative positional relationship between the recording medium and the recording head and attaching the aqueous ink for ink jet recording to the recording medium.

In general, in a serial-type ink jet recording apparatus, the transport direction of the recording medium and the direction in which the recording head reciprocates intersect each other and the reciprocating operation of the recording head and the transport operation (also including the reciprocation operation) of the recording medium combine to change the relative positional relationship between the recording medium and the recording head. In this case, in general, a plurality of nozzle holes (holes for ejecting aqueous ink for ink jet recording) are arranged in the recording head, and a row (nozzle row) of nozzle holes is formed in the transport direction of the recording medium. In addition, a plurality of nozzle rows may also be formed in the recording head according to the kind and number of aqueous inks for ink jet recording.

In addition, generally, in a line type ink jet recording apparatus, the recording head does not perform a reciprocating operation and the relative positional relationship between the recording medium and the recording head changes according to the transportation of the recording medium. In this case as well, in general, a plurality of nozzle holes are arranged in the recording head, and a row (nozzle row) of the nozzle holes is formed in a direction intersecting the transport direction of the recording medium.

The ink jet recording method uses a serial type or line type ink jet recording apparatus as described above and there is no particular limitation on the method as long as it is possible to eject aqueous ink for ink jet recording as liquid droplets from fine nozzle holes and attach the liquid droplets to the recording medium. For example, examples of an ink jet recording method include an electrostatic suction method, a method in which ink droplets are discharged by pump pressure, a method using a piezoelectric element, a method in which an ink liquid is heated and foamed with a microelectrode to discharge the ink droplets, and the like.

For the ink jet recording apparatus used in the present embodiment, for example, it is possible to adopt well-known configurations such as a heating unit, a drying unit, a roll unit, or a winding apparatus without limitation.

In a configuration in which the ink jet recording apparatus has a heating unit, the heating unit is able to heat the recording medium and/or the aqueous ink for ink jet recording (image) on the recording medium in the recording head in at least one of during the image forming or after the image forming. Due to this, it is possible to promptly evaporate the liquid medium contained in the aqueous ink for ink jet recording attached on the recording medium. Due to this, it is possible to obtain high-quality images on the recording medium in a short time. In addition, as the heating unit, the aqueous ink for ink jet recording in the recording head may be heated for the purpose of lowering the viscosity of the aqueous ink for ink jet recording. Due to this, there may be a configuration in which the viscosity of the aqueous ink for ink jet recording is reduced to improve the ejection property. As a specific heating means, forced air heating, radiation heating, conductive heating, high frequency drying, microwave drying, and the like are preferably used.

3. EXAMPLES AND COMPARATIVE EXAMPLES

A more detailed description will be given of the invention with reference to Examples, but the invention is not limited to these Examples.

3.1. Preparation of Resin Particle Dispersion (Resin Emulsion)

3.1.1. Resin Particle Dispersion 1

50 g of methyl methacrylate as a monomer, 100 g of 2-ethylhexyl methacrylate, 3.5 g of Eleminol CLS-20 (trade name, manufactured by Sanyo Chemical Industries, Ltd.) as a nonreactive surfactant, and 100 g of ion-exchanged water were mixed by a homomixer to prepare a monomer emulsion 1.

100 g of methyl methacrylate as a monomer, 50 g of 2-ethylhexyl methacrylate, 1 g of methacrylic acid, 3.5 g of Antox LMA-10 (trade name, manufactured by Nippon Nyukazai Co., Ltd.) as a non-ionic reactive surfactant, and 100 g of ion-exchanged water were mixed by a homomixer to prepare a monomer emulsion 2.

An initiator solution in which 0.5 g of ammonium persulfate as a polymerization initiator was dissolved in 20 g of ion exchanged water was prepared.

Next, 150 g of ion exchanged water, 0.2 g of sodium hydrogencarbonate, and 50 g of the monomer emulsion 1 were added to a reactor provided with a stirrer, a reflux condenser tube, a thermometer, a nitrogen inlet tube, and three dropping funnels, and the mixture was stirred at 80° C. for 30 minutes while bubbling with nitrogen. Subsequently, the initiator solution was added thereto from a dropping funnel over 15 minutes and the entire remaining amount of the monomer emulsion 1 was added thereto from the dropping funnel over 1.5 hours. Subsequently, the entire amount of the monomer emulsion 2 including the non-ionic reactive surfactant was added from a dropping funnel over 2 hours to conduct polymerization. After 3 hours of aging, cooling was carried out and the pH was adjusted to 7.5 by addition of ion exchanged water and aqueous ammonia to prepare a resin particle dispersion 1 having a solid content concentration of 40% as fixing resin particles. When the average particle size of the resin particles of the obtained resin particle dispersion 1 was measured using Microtrac UPA (manufactured by Nikkiso Co., Ltd.), the average particle size was 250 nm.

3.1.2. Preparation of Resin Particle Dispersions 2 and 3

Resin particle dispersions 2 and 3 were prepared in the same manner as in the preparation of resin particle dispersion 1 described above except that the kinds and addition amounts of each material were changed as shown in Table 1. The average particle size of the resin particles in each dispersion is shown in Table 1.

TABLE 1

|  |  | Resin Particle Dispersion No. | | |
|---|---|---|---|---|
|  |  | 1 | 2 | 3 |
| Monomer emulsion 1 | Methyl methacrylate | 50 g | 25 g | 25 g |
|  | 2-ethylhexyl methacrylate | 100 g | 100 g | 100 g |
|  | Styrene | — | 25 g | 25 g |
|  | Non-reactive surfactant Eleminol CLS-20 | 3.5 g | — | — |
|  | Non-reactive surfactant Pelex SS-H | — | 3.5 g | 3.5 g |
|  | Ion-exchanged water | 100 g | 100 g | 100 g |
| Monomer emulsion 2 | Methyl methacrylate | 100 g | 100 g | 100 g |
|  | 2-ethylhexyl methacrylate | 50 g | 50 g | 50 g |
|  | Methacrylate | 1 g | 1 g | 1 g |
|  | Styrene sulfonic acid sodium | — | 0.5 g | — |
|  | Non-reactive surfactant Antox LMA-10 | 3.5 g | — | 3.5 g |
|  | Non-reactive surfactant Aqualon RN | — | 3.5 g | — |
|  | Ion-exchanged water | 100 g | 100 g | 100 g |
| Polymerization initiator | Ammonium persulfate | 0.5 g | 0.5 g | 0.5 g |
|  | Average particle size (nm) | 250 | 200 | 180 |

In Table 1, "Pelex SS-H" was obtained from Kao Corp. In addition, "Aqualon RN" was obtained from DKS Co., Ltd.

3.2. Preparation of Ink 10 g of a separately prepared cyan pigment dispersion (pigment concentration 15% by mass), 0.1 g of KM-(trade name, manufactured by Shin-Etsu Chemical Co., Ltd.) as a water-dispersible polysiloxane-based defoaming agent, 0.5 g of Silface SAG503A (trade name, manufactured by Nissin Chemical Industry Co., Ltd.) as a water-soluble silicone-based surfactant, 5 g of 1,2-hexanediol (log P=0.7) as a glycol-based solvent, 25 g of resin emulsion 1, 15 g of glycerin as a moisturizer, and 0.4 g of triisopropanolamine as a pH adjusting agent were mixed, ion exchanged water was added thereto to make the total amount 100 g, and the result was thoroughly stirred. Thereafter, filtration was performed with a membrane filter having a pore diameter of 1.2 µm to prepare an ink of Example 1.

An ink of each example was prepared in the same manner as in the preparation of the ink of Example 1 except that the kinds and added amounts of each material were changed as shown in Table 2.

TABLE 2

| Ink composition Added amounts (g) | | Example | | | Comparative Example | |
|---|---|---|---|---|---|---|
|  |  | 1 | 2 | 3 | 1 | 2 |
| Coloring material | Cyan pigment dispersion | 10 | 10 | 10 | 10 | 10 |
| Water-dispersible polysiloxane-based defoaming agent | KM-85 | 0.1 | — | 0.1 | — | 0.1 |
|  | TSA6406 | — | 0.1 | — | — | — |
| Water-soluble silicone-based surfactant | Silface SAG503A | 0.5 | — | — | 0.5 | — |
|  | BYK-348 | — | 0.8 | 0.5 | — | — |
| Glycol-based solvent | 1,2-hexanediol | 5 | — | 5 | 5 | — |
|  | 2-methyl-3-phenoxy-1,2-propanediol | — | 2 | — | — | — |
| Resin | Resin particle dispersion 1 | 25 | — | — | 25 | — |
|  | Resin particle dispersion 2 | — | 25 | — | — | — |
|  | Resin particle dispersion 3 | — | — | 25 | — | 25 |
| Moisturizer | Glycerin | 15 | 15 | 15 | 15 | 15 |
| Surfactant | Surfynol 465 | — | 0.5 | 1 | — | 1 |
| pH adjusting agent | Triisopropanolamine | 0.4 | 0.4 | 0.4 | 0.4 | 0.4 |
|  | Ion-exchanged water | Remainder | Remainder | Remainder | Remainder | Remainder |
| Evaluation results | Storage stability | A | A | A | A | C |
|  | Defoaming property | A | A | A | C | A |
|  | Ejection stability | A | A | A | B | C |

In Table 2, "TSA 6406" is a water-dispersible polysiloxane-based defoaming agent obtained from Momentive Performance Materials Japan, LLC. "BYK-348" was obtained from BYK Chemie Japan.

3.3. Evaluation of Ink 3.3.1. Storage Stability

Each of the inks of Examples and Comparative Examples was placed in a sample bottle and stored at two levels of 60° C. and −20° C. for one week, after which each ink was filtered and a precipitate was collected. The storage stability was evaluated according to the number and appearance of the total of the precipitates at the two levels. Evaluation criteria are shown below.

A: Less than 50 particles/1 mL of precipitate
B: 50 particles/1 mL or more and less than 200 particles/1 mL of precipitate
C: 200 particles/1 mL or more of precipitate, or the ink was split 3.3.2. Defoaming Property Each ink of the Examples and Comparative Examples was placed in a sample bottle up to 1/10 the height of the sample bottle, stirred for 1 minute, left to stand as it was, and then the defoaming property was evaluated according to the height of the foam remaining after 10 minutes. The evaluation criteria are shown below.

A: Less than 10% of the ink height
B: 10% or more and less than 100% of the ink height
C: 200% or more of the ink height 3.3.3. Ejection Stability Each ink of Example and Comparative Example was filled in an ink jet type printer EM-930C (trade name, manufactured by Seiko Epson Corp.) and, immediately after repeating cleaning three times, continuous printing was performed on 20 pages while ejecting from all of the nozzles, and the number of print omissions and bent nozzles were evaluated based on the following criteria.

A: 0 to 2 omissions or bent nozzles
B: 3 to 9 omissions or bent nozzles
C: 10 or more omissions or bent nozzles 3.4. Evaluation Results The above evaluation results are also shown in Table 2. Looking at the evaluation results, the inks of the respective Examples including the coloring material, the water-dispersible polysiloxane-based defoaming agent, the water-soluble silicone-based surfactant, the glycol-based solvent, the resin particles including the non-ionic reactive surfactant as the constituent unit all had extremely good results in terms of storage stability, defoaming property, and ejection stability. This result indicates that at least the defoaming agent is sufficiently solubilized by the water-soluble silicone-based surfactant and the glycol-based solvent, that aggregation of the resin particles does not occur, and that the defoaming agent has a sufficient defoaming property to obtain ejection stability.

On the other hand, the results showed that the ink of Comparative Example 1 which did not include the defoaming agent had insufficient storage stability and defoaming property. In addition, in Comparative Example 2 which did not include a water-soluble silicone-based surfactant, the storage stability and ejection stability were insufficient. It is considered that this suggests that, even if a glycol-based solvent is used, when there is no water-soluble silicone-based surfactant, it is not possible to sufficiently solubilize the water-dispersible polysiloxane-based defoaming agent.

The invention is not limited to the embodiments described above and various modifications are possible. For example, the invention includes configurations substantially the same as the configuration described in the embodiment (for example, a configuration having the same function, method, and result, or a configuration having the same object and effect). In addition, the invention includes configurations in which non-essential parts of the configuration described in the embodiment are replaced. In addition, the invention includes configurations achieving the same operation and effect as the configuration described in the embodiment, or configurations which are able to achieve the same object. In addition, the invention includes a configuration in which a known technique is added to the configuration described in the embodiment.

The entire disclosure of Japanese Patent Application No. 2017-152279, filed Aug. 7, 2017 is expressly incorporated by reference herein.

What is claimed is:

1. An aqueous ink for ink jet recording comprising:
a coloring material;
a water-dispersible polysiloxane-based defoaming agent;
a water-soluble silicone-based surfactant;
a glycol-based solvent; and
resin particles including a non-ionic reactive surfactant in a constituent unit.

2. The aqueous ink for ink jet recording according to claim 1,
wherein a content of the water-dispersible polysiloxane-based defoaming agent is 0.01% by mass or more and 1% by mass or less.

3. The aqueous ink for ink jet recording according to claim 1,
wherein a content of the water-soluble silicone-based surfactant is 0.1% by mass or more and 5% by mass or less.

4. The aqueous ink for ink jet recording according to claim 1,
wherein a water-octanol distribution coefficient of the glycol-based solvent is 0.0 or more and 2.0 or less.

* * * * *